UNITED STATES PATENT OFFICE.

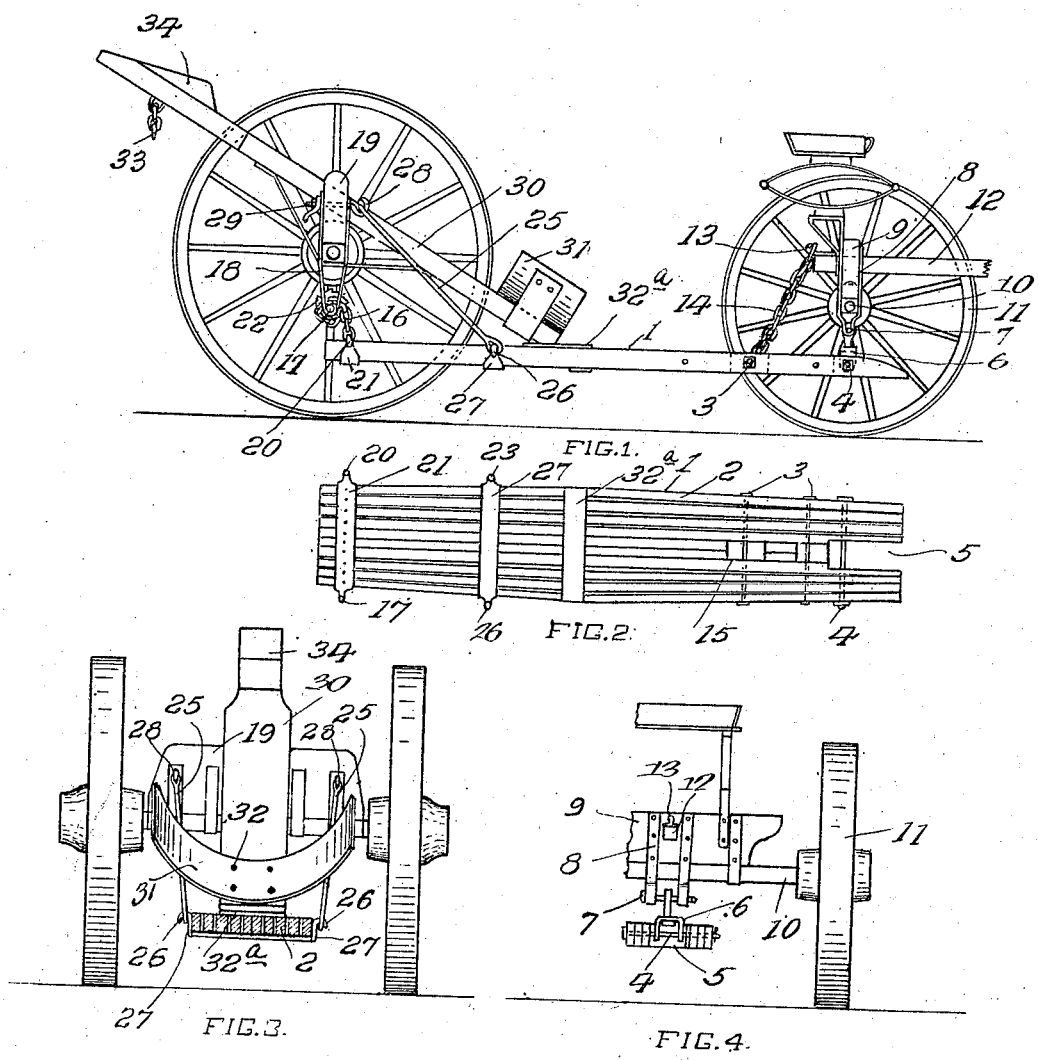

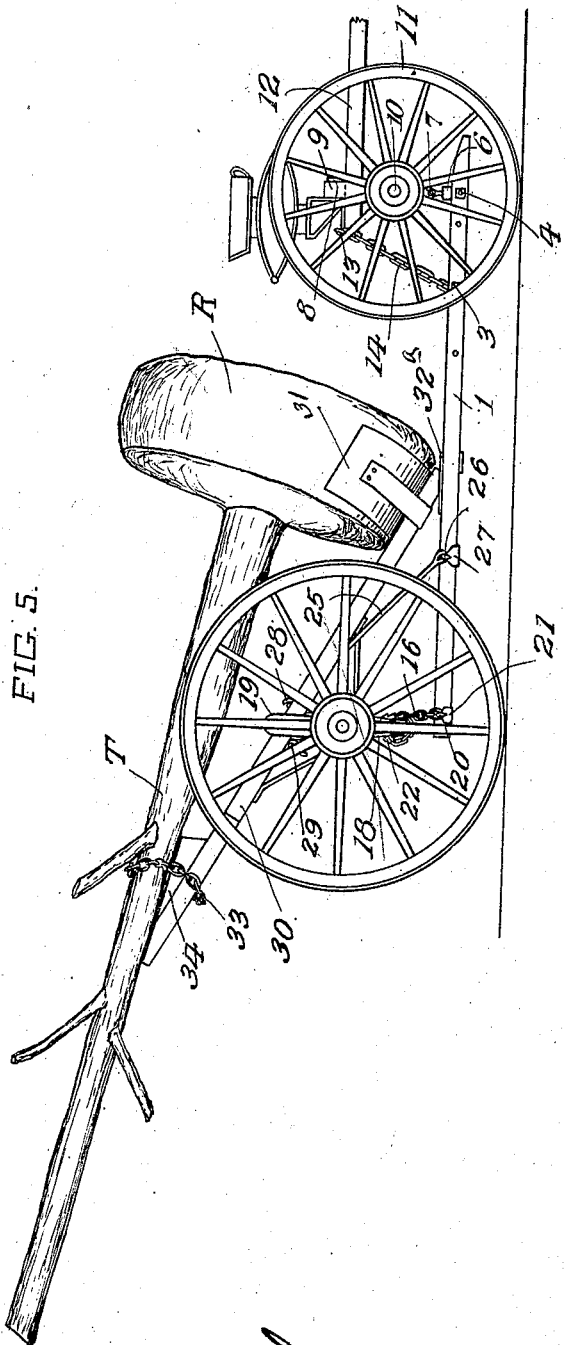

EDGAR D. WILLIAMSON, OF MEMPHIS, TENNESSEE.

TREE-CARRIER.

1,235,624.  Specification of Letters Patent.  Patented Aug. 7, 1917.

Application filed August 24, 1916. Serial No. 116,664.

*To all whom it may concern:*

Be it known that I, EDGAR D. WILLIAMSON, a citizen of the United States, residing at Memphis, Shelby county, and State of Tennessee, have invented and discovered certain new and useful Improvements in Tree-Carriers, of which the following is a specification.

The present invention relates to tree carriers and consists in the combinations and arrangements of elements hereinafter described and particularly set forth in the accompanying claims.

The invention has for its purpose to provide a vehicle for transporting trees to be transplanted, in such a manner that the bulk of the earth naturally adhering to the roots of the tree may be carried to the place of replanting and the trunk of the tree so supported as to avoid likelihood of mutilating the bark, and to make it possible to cut the roots of the tree uniform in length on all sides.

The invention has for its further purpose to provide a vehicle of this character having a form of support which may be readily applied to the tree, and one which will hold the tree in a position clear of the vehicle and the ground, without previous mutilation, during transportation; and which will serve for readily removing the tree from the vehicle at the place of transplanting.

The invention is disclosed by way of illustration in the accompanying drawings, wherein—

Figure 1 is a side elevational view of the tree carrier,

Fig. 2 a detail top plan view of the body of the vehicle,

Fig. 3 a transverse sectional view of the tree carrier looking toward the rear,

Fig. 4 a similar view looking toward the front, and

Fig. 5 shows the manner of using the carrier.

Referring to the construction in further detail, 1 designates the body of the wagon, which is constructed of a plurality of strips 2 connected at the front end by the tie-rods 3 and 4, and said front end is cut away, as at 5, to receive the member 6 pivoted on the bolt 4 and which has pivotal connection with the bolt 7 supported by the pair of straps 8. Said straps 8 are secured to the bolster 9 and axle 10 of the front vehicle wheels 11. The tongue 12 is fitted to the bolster 9, after the usual manner, and, at its rear inner end, carries a hook 13 adapted to engage with a link of the chain 14 that is connected to one of the bolts 3 through the opening 15 in the body 1, to receive the latter and lift the tree, together with the body lifting means at the rear end of the vehicle. When the fore end of the body 1 has been lifted, it is secured in position by the bolt 7, after the manner illustrated in Figs. 1 and 4.

The rear end of the body 1 is adapted to be elevated to lift the tree by means of a pair of chains 16 that are wound on the shaft 17 suitably journaled in the pair of hangers 18 that are, in turn, secured to the rear bolster 19. Said chains 16 have their free ends connecting with the hooks 20 of the bar 21 that is secured to the respective strips of the body 1 in any approved manner; and a ratchet wheel 22, mounted on shaft 17, is designed to be engaged by a pawl, after the usual manner, for holding the body 1, with the tree therein, in raised position (see Figs. 1 and 5). In addition to thus holding the body or frame in raised position, a pair of bracing or supporting rods 25 is connected to the pair of hooks 26 of the cross bar 27, and the hooks 28 of the fastening bolts 29 on the bolster 19.

The tree supporting member consists of a frame 30 adapted to be carried in an upwardly and rearwardly inclined position, to the end that the upper portion and trunk of the tree will be clear of the ground while under transportation, and for convenience of movement of the vehicle. The tree holding frame 30 is constructed at its lower end with a curved plate 31, suitably secured by the bolts 32, and of sufficient dimensions to embrace the root portion R, with the earth adhering thereto, of the tree T, as shown in Fig. 5. A plate 32$^a$, mounted on the body 1, provides a suitable base for the end of the frame 30, and thereby avoids any likelihood of injury to said body, as will be understood. A chain 33 is carried by the frame 30 at its upper end for tying about the trunk of the tree that rests upon the block 34, and with this manner of securing the tree, the same is transported.

It will therefore be seen, from the foregoing, that a tree may be placed upon the vehicle for transportation in its normal condition, without requiring the mutilation of the root portion or scarring the trunk as by stripping the bark therefrom, which usually attends the present method of carrying trees for transportation.

It is obvious that those skilled in the art may vary the detail of construction and arrangement of parts without departing from the spirit of my invention, and therefore I do not wish to be limited to such features except as may be required by the claims.

Having thus fully described my said invention, what I claim as new and desire to secure by Letters Patent, is:

1. In a tree carrier the combination of a wheeled vehicle having a tongue, a front bolster, and a low set platform body, a chain connecting the platform at the forward end with said tongue and adapted for raising and lowering the body, means for securing the forward end of the body to said front bolster in raised position, chains supporting the body at the rear end thereof from the rear bolster and adapted for raising and lowering the body, supporting rods connected to the rear bolster for holding the rear end of the body in raised position, and a tree supporting frame mounted on said platform body between said supporting rods, and constructed to embrace the tree roots with the earth adhering thereto, substantially as set forth.

2. In a tree carrier, the combination of a wheeled vehicle having a tongue and a low set platform body, said body constructed of assembled strips having a recessed forward end portion, a chain connecting the platform at the recessed end thereof with said tongue and adapted for raising and lowering the body, means for securing the forward end of the body in raised position, a transversely disposed bar secured to and reinforcing said strips at the rear end thereof, a pair of chains engaging said bar and supporting the body at the rear end thereof and adapted for raising and lowering the same, a pair of side supporting rods for holding the rear end of the body in raised position, and a tree supporting frame mounted on said platform body between said supporting rods and constructed to embrace the tree roots with the earth adhering thereto, substantially as set forth.

3. In a tree carrier, the combination of a wheeled vehicle having a tongue and a low set platform body, said body constructed of a plurality of assembled strips having a recessed forward end portion, bolts passing through said strips at said recessed end portion, a chain connecting one of said bolts of the platform with said tongue and adapted for raising and lowering the body, means for connecting with another of said bolts to secure the forward end of the body in permanently raised position, a pair of transversely disposed bars secured to and reinforcing the body strips at the rear end thereof and substantially medially of the body, a pair of chains engaging the endmost of said bars for supporting the body at the rear end thereof and adapted for raising and lowering the same, a pair of side rods engaging with the other of said bars for holding the rear end of the body in permanently raised position, a plate secured to the strips adjacent said second reinforcing bar, and a tree supporting frame mounted on said plate between said supporting rods and constructed to embrace the tree roots with the earth adhering thereto, substantially as set forth.

In witness whereof, I have hereunto set my hand and seal at Memphis, Tennessee, this 29th day of July, A. D. nineteen hundred and sixteen.

EDGAR D. WILLIAMSON. [L. S.]

Witnesses:
JOHN L. STOUT,
JOHN W. FARLEY.

Copies of this patent may be obtained for five cents each, by addressing the "Commissioner of Patents, Washington, D. C."